March 26, 1957 YOSHIMITSU OISHI 2,786,635
APPARATUS FOR RECLAIMING RUBBER MATERIAL
Filed March 29, 1955 2 Sheets-Sheet 1

United States Patent Office 2,786,635
Patented Mar. 26, 1957

2,786,635

APPARATUS FOR RECLAIMING RUBBER MATERIAL

Yoshimitsu Oishi, Shioya-gun Tochigi-ken, Japan, assignor to Muraoka Rubber Reclaiming Co., Ltd., Ichikawa-Machi, Chibaken, Japan Application March 29, 1955, Serial No. 497,515

4 Claims. (Cl. 241—79)

The present invention relates to apparatus for reclaiming scrap rubber and particularly to apparatus for separating the fiber and the rubber from rubber scrap such as tire casings. The term "rubber" is used in a generic sense to include artificial as well as natural rubbers.

The present invention is an improvement over the apparatus disclosed in my prior Patent No. 2,686,011. Certain elements disclosed in my prior patent are utilized in the present improvement. However, additional means are provided for insuring a complete separation of the rubber and the fiber. The novel devices for separating the fiber from the rubber will be described more fully hereinafter.

It is an object of the present invention to provide substantially complete separation of the fiber and rubber of vulcanized rubber scrap in a rapid, efficient and inexpensive manner so as to produce a high grade of reclaimed rubber.

Other objects and advantages of the invention will become apparent from the following description, the claims and the accompanying drawings, in which:

Figure 1:
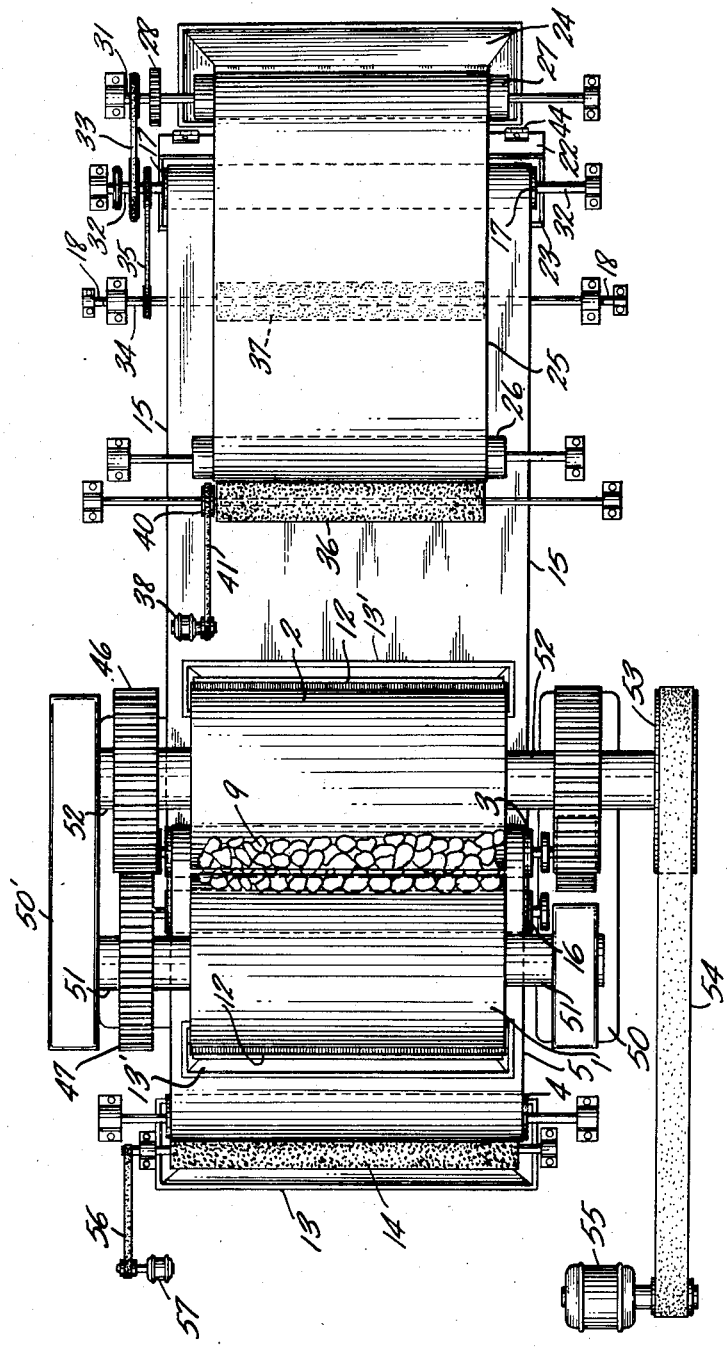
Fig. 1 is a plan view of the apparatus embodying the present invention.

The apparatus shown by way of example in the drawings comprises two hard smooth parallel closely spaced rollers 1 and 2. The rollers are formed of, or at least have an outer shell of, hard wear-resistant material such as chilled steel or white pig iron ($Fe_3C$) and are of a suitable diameter, for example 12 to 24 inches, a diameter of about 18 inches being presently preferred. The space tween the rollers is very small, for example of the order of 0.5 mm., it being understood that somewhat smaller and larger spacing can be used, for example 0.25 mm. to 1 mm. The rollers 1 and 2 are arranged side by side with their axes parallel and are adapted to rotate in opposite directions so that material fed between the rollers will be discharged downwardly.

Below the rollers 1 and 2, there is provided a conveyor belt 5 supported by rollers 3 and 4. The conveyor belt 5 is formed of suitable material such as rubber or canvas. The position of the conveyor belt 5 relative to the rollers 1 and 2 is such that material discharged downwardly from between the rollers falls on the conveyor belt near its discharge end.

Below the discharge end of the conveyor belt 5, there is provided a vibrating screen or sieve 6 having discharge spouts 7 and 8 for the coarser and finer material, respectively.

Figure 2:
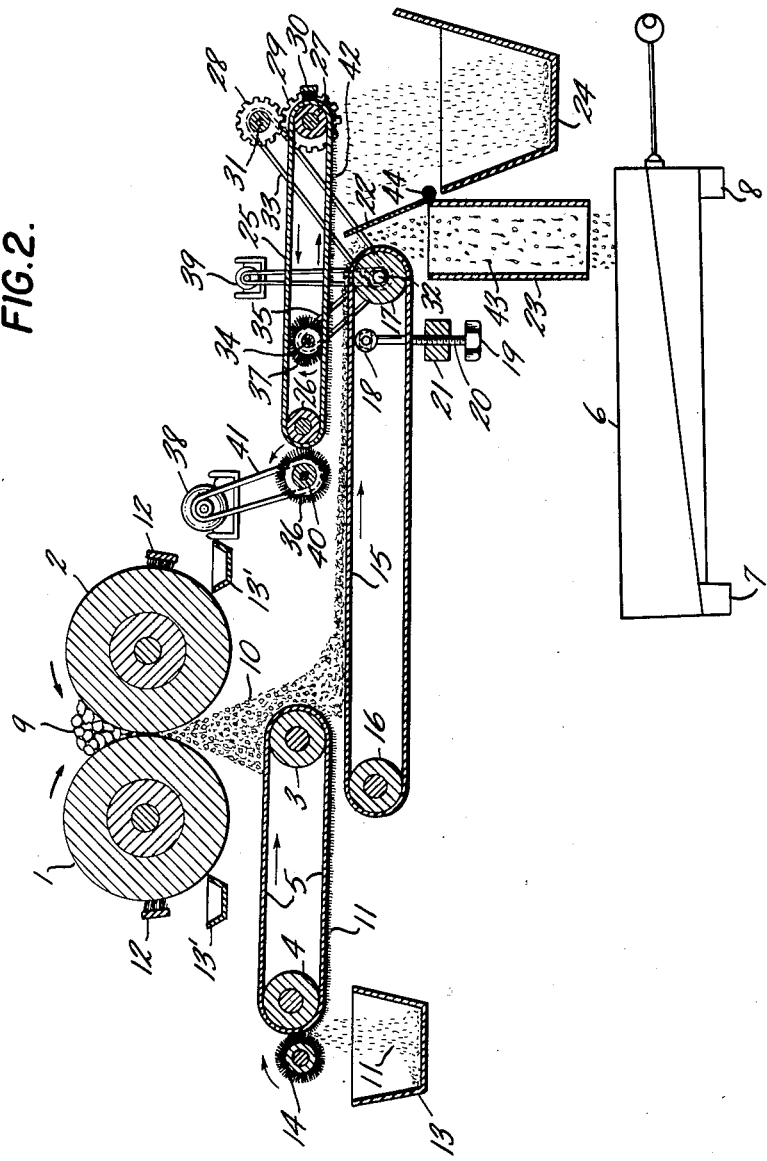
Fig. 2 is a cross sectional schematic diagram of the apparatus.

As the rollers 1 and 2 are turned in opposite directions, as indicated by the arrows (Fig. 2) cut scrap rubber 9 is fed downwardly between them. The rollers 1 and 2 are driven at different peripheral speeds, the ratio of speeds being preferably approximately 10:12. It will be understood that some variation in this ratio is permissible, for example 10:11 to 10:15. The peripheral speed of the rollers 1 and 2 is preferably of the order of 100 to 250 feet per minute. Thus, with eighteen-inch rollers, the speed of rotation will be about 21 R. P. M. to 45 or 50 R. P. M., best results have been obtained with a speed of about 37 R. P. M. It will be understood that, instead of making the rollers the same size and driving them at different speeds, the rollers may be of different size and driven at the same (or different) speed in order to provide the required ratio of peripheral speeds.

The cut rubber scrap 9 fed down between the rollers 1 and 2 is subjected to an intense crushing and rubbing action which separates the fiber in the scrap from the rubber and, at the same time, generates a high electrostatic charge by friction. The electrostatic charge on the rollers becomes so high that the rollers will gleam in the dark. The particles of rubber are discharged downwardly from between the rollers 1 and 2, as indicated at 10, but, because of the electrostatic charge, the fibers 11 cling to the rollers 1 and 2 and are removed by brushes 12. The fibers removed from the rollers by the brushes 12 drop into suitable receptacles 13.

The rubber particles 10 are discharged downwardly from between the rollers 1 and 2 so that all or most of them fall onto the conveyor belt 5 which is driven at a suitable speed in the direction of the adjacent arrow. It will be seen that the rubber particles 10 fall on the conveyor 5 near its discharge end where the conveyor belt has not only a translational movement but also a rotary movement as it passes over the roller 3. The particles of rubber 10 fall off the conveyor 5 as it passes over the roller 3 while particles of fiber 11 that have not already been removed by adhering to the rollers 1 and 2 adhere to the conveyor belt 5 because of the electrostatic charge they carry. An opposite charge is induced in the conveyor belt 5. As they are carried along by the lower return run of the conveyor belt 5, the fiber particles 11 gradually lose their charge and drop into a suitable receptacle 13.

The remaining fiber on belt 5 is removed therefrom by the brush 14 rotating in the direction indicated by the arrow adjacent thereto.

Below the belt 5, there is positioned a belt 15 on rollers 16 and 17. The belt 15 may travel at the same speed and in the same direction as belt 5. The rubber particles 10 are discharged from belt 5 onto the belt 15 and are conveyed thereby to the discharge end of belt 15. Immediately above the belt 15 and parallel to the belt 15 is a belt 25 the lower run of which travels in the same direction as the upper run of belt 15. The belt 25 runs over rollers 26 and 27. A brush 36 is mounted in contact with belt 25 opposite roller 26. Another brush 37 is mounted within belt 25. The brushes 36 and 37 are driven in the direction indicated by the arrows adjacent thereto. The brush 36 produces a static electric charge on the outer side of belt 25 while the brush 37 produces a static electric charge on the inner side of the lower run of belt 25.

Any fiber remaining on the belt 15 is subjected to the very strong static electrical charge on the belt 25 and consequently is attracted to the belt 25. The fiber particles attracted to the lower run of belt 25 gradually lose their charge as they travel toward the roller 27 and such fiber particles 42 fall into the receptacle 24. The remaining fiber particles on belt 25 are removed therefrom by the scraper or brush 30. Thus, the rubber particles 43 reaching the discharge end of belt 15 are free of fiber. These rubber particles are discharged against a hinged sheet or divider 22 which deflects the particles into the chute 23 through which they travel into the sieve 6. The sieve 6 is provided with an outlet 7 for fine particles and another outlet 8 for larger particles of rubber. The upper side of sheet 22 serves as a deflecting plate for the fiber particles 42 falling from the belt 25 toward the hopper 24. The deflecting sheet 22 is hinged to the chute 23 by the spring loaded hinge 44 and is biased by gravity and its own weight toward the belt 15. However, the rubber particles impinging on the sheet 22 tend to move it away from the belt 15. Accordingly, the sheet 22 provides a larger opening between itself and belt 15 when the number of rubber particles is greater, and a smaller opening when the number of rubber particles on belt 15 decreases and, at the same time, the sheet 22 regulates in a converse manner the area along the discharge end of the belt 25 from which the fiber particles 42 may be received into the hopper 24.

In this manner the divider acts as a throttle or regulating valve as a means of making sure that during the time that the belt 15 (traveling at constant speed) is carrying a heavy load of particles that no back pressure is created in the discharge stream of rubber particles which would tend to pile up the rubber on the belt 15 and make the removal of the lowermost fibers adjacent the belt harder to remove, as would be the case if the divider was in fixed position. However, when the load is very light it is desirable to create a back pressure to permit the strong charge produced by brush 37 to act on the fibers and remove them.

A roller 18 presses against the underside of the upper run of belt 15. The vertical position of roller 18 may be adjusted by turning the head 19 of the screw 20, the upper end of which supports the bearing of roller 18. The screw 20 extends through a fixed supporting member 21 threaded to receive the screw 20. In this manner, the upper run of belt 15 may be adjusted toward or away from the belt 25. A suitable spacing between the belts 15 and 25 is from about ¼ to ½ inch.

Belts 5 and 25 are formed of a suitable insulating material, such as a vinyl chloride material. Belt 15 may be formed of cotton or canvas, for example. All three belts may travel with a linear speed of about 80 feet per second. The speed of brushes 14, 36 and 37 may be, for example, 1400 R. P. M. These brushes are preferably cylindrical, as shown, but the brush 37 is preferably elliptical in cross section. It has been found that by making the brush 37 elliptical in cross section produces a greater static charge on the belt 25.

In some instances it has been found desirable to electrically insulate the rollers 1 and 2 as well as the rollers 3 and 4 of the conveyor 5. This may be done by providing a layer of electrical insulating material between each roller and its shaft. Alternatively, a layer of insulating material may be provided on the outside surfaces of the rollers 3 and 4. It may be desirable to also insulate the rollers 26 and 27 in any suitable manner.

As is explained in my prior patent, a considerable amount of heat is generated at the rollers 1 and 2. It is desirable to maintain the rollers at a moderate temperature, say 60° to 70° C. For this purpose, a suitable cooling means may be provided, such as, for example, that disclosed in my prior patent.

The rollers 1 and 2 are driven by a motor 55 through a V-belt 54, pulley 53, shaft 52 and gears 46 and 47. Shafts 51 and 52 of rollers 1 and 2 are mounted in supports 50, 50'. The brush 14 is driven by a motor 57 through a V-belt 56 while the brush 36 is driven by motor 38 connected to pulley 40 by belt 41. The shaft 32 of roller 17 is driven by motor 39. The shaft 32 is connected by belt 35 to pulley 34 to drive the brush 37. The roller 27 is driven through gears 28 and 29 and the belt 33 connecting the shaft 31 of gear 28 with the shaft 32.

The invention thus provides simple and effective apparatus for separating rubber and fiber in vulcanized rubber scrap.

While only one particular embodiment of the invention has been illustrated and described, it will be understood that the apparatus is subject to modification within the spirit of the invention and the scope of the appended claims.

What I claim and desire to secure by Letters Patent is:

1. An apparatus for reclaiming rubber material containing fiber, a pair of smooth parallel spaced rollers, means for turning the rollers in a direction toward each other whereby rubber fed between the rollers has the fiber freed therefrom and the fiber is electrostatically charged, a first electrostatically charged conveyor belt receiving the stream of rubber and the freed fiber near one end thereof, whereby fibers are removed and the remaining fibers and rubber are discharged downwardly, a second conveyor belt receiving the stream of rubber and fiber from said first conveyor, a third conveyor belt in proximity to the second conveyor belt and being electrostatically charged to remove the remaining loose fiber on the second conveyor belt, means rotating said belts, means for producing an electrostatic charge on said first and third conveyor belts, said last mentioned means including a rotary brush in contact with the inner side of the third conveyor belt, said brush being substantially elliptical in shape, means for rotating said brush in a direction counter to the direction of travel of said third belt, whereby a localized and intensified charge varying in intensity is given third belt and an electrostatic field varying in intensity is established, whereby the uppermost charged and conductive fibers are attracted to said third conveyor when said field is at its lowest intensity thus exposing lowermost fibers under said uppermost fibers and said exposed lowermost fibers are attracted by said intensified charged portions of the belt as said third and second belts are rotated, means for collecting the rubber particles from said second conveyor belt.

2. Apparatus according to claim 1, including means for adjusting the spacing between the upper run of the second belt and the lower run of the third belt, said last mentioned means being positioned to cooperate with said elliptical brush by spacing the belts closer together at a point substantially in the vertical plane of the brush.

3. An apparatus for reclaiming rubber material containing fiber, a pair of smooth parallel spaced rollers, means for turning the rollers in a direction toward each other whereby rubber fed between the rollers has the fiber freed therefrom and the fiber is electrostatically charged, a first electrostatically charged conveyor belt receiving the stream of rubber and the free fiber near one end thereof, whereby fibers are removed and the remaining fibers and rubber are discharged downwardly, a second conveyor belt receiving the stream of rubber and fiber from said first conveyor, a third conveyor belt in proximity to the second conveyor belt and being electrostatically charged to remove the remaining loose fiber on the second conveyor belt, means rotating said belts, means for producing an electrostatic charge on said first and third conveyor belts, said last mentioned means including a rotary brush in contact with the inner side of the third conveyor belt, said brush being substantially elliptical in shape, means for rotating said brush in a direction counter to the direction of travel of said third belt, whereby a localized and intensified charge varying in intensity is given third belt and an electrostatic field varying in intensity is established, means for collecting the rubber particles from said second conveyor belt, said last mentioned means including a deflecting member in the path of the rubber particles discharged from the second conveyor belt, and means for mounting the deflecting member or causing the facing to vary directly in accordance with the amount of rubber being discharged from said second belt, whereby a slight back pressure is built up in the stream of rubber being discharged from said second belt thereby permitting said intensified charge and field to act on said remaining fibers.

4. Apparatus according to claim 3, wherein said deflecting member is a rigid inclined sheet and said mounting means thereof is a hinge at the lower end of the sheet positioned so that the sheet is gravitationally biased toward the discharged end of the second conveyor belt.

References Cited in the file of this patent

UNITED STATES PATENTS

| | | |
|---|---|---|
| 254,039 | Osborne | Feb. 21, 1882 |
| 1,110,896 | Comstock | Sept. 15, 1914 |
| 2,127,307 | Oppen | Aug. 16, 1938 |
| 2,686,011 | Oishi | Aug. 10, 1954 |